United States Patent
Asefi et al.

(10) Patent No.: US 11,281,765 B1
(45) Date of Patent: *Mar. 22, 2022

(54) TOKEN MANAGEMENT SYSTEMS AND METHODS

(71) Applicant: Wells Fargo Bank, N.A., San Francisco, CA (US)

(72) Inventors: Azita Asefi, Vacaville, CA (US); Jinee K. Ellis, San Francisco, CA (US); Alan W. Hecht, Chanhassen, MN (US); Timothy R. Knowlton, Mill Valley, CA (US); Ashish B. Kurani, Hillsborough, CA (US); Steven E. Puffer, Champlin, MN (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/723,903

(22) Filed: Dec. 20, 2019

Related U.S. Application Data

(63) Continuation of application No. 15/380,966, filed on Dec. 15, 2016, now Pat. No. 10,565,364.
(Continued)

(51) Int. Cl.
*G06F 21/45* (2013.01)
*G06F 21/30* (2013.01)
(Continued)

(52) U.S. Cl.
CPC ............. *G06F 21/45* (2013.01); *G06F 21/30* (2013.01); *G06F 21/31* (2013.01);
(Continued)

(58) Field of Classification Search
CPC .......... G06F 21/45; G06F 21/30; G06F 21/31; G06F 2212/178; G06F 2221/0711; G06Q 20/3672; G06Q 20/3674
See application file for complete search history.

(56) References Cited

U.S. PATENT DOCUMENTS

| 4,249,648 A | 2/1981 | Meyer |
| 7,979,702 B2 | 7/2011 | Herbert et al. |

(Continued)

OTHER PUBLICATIONS

ACI Worldwide, Inc., ACI Token Manager for Mobile: Token Service Provision, HCE and Embedded Secure Element in the Cloud product flyer, available online at least as early as on Mar. 16, 2015, retrieved from the internet at: http://www.aciworldwide.com/-/media/files/collateral/aci-token-manager-pf-us-4917-0212.pdf on Aug. 19, 2015, 6 pages.

*Primary Examiner* — Theodore C Parsons
*Assistant Examiner* — Howard H. Louie
(74) *Attorney, Agent, or Firm* — Foley & Lardner LLP

(57) ABSTRACT

A method of managing tokens is provided. The method includes receiving, by a token management system from a user device, a request from a user to register a token with the token management system. The token is associated with the user and is stored by an entity computing system associated with a first entity of a plurality of entities. Each of the plurality of entities is associated with an entity computing system that stores at least one token of a plurality of tokens that are each registered with the token management system and each associated with the user. The method further includes modifying, by the token management system, the token stored by the entity computing system associated with the first entity based on a token command from the user. The modification includes associating the token with a different entity of the plurality of entities relative to the first entity.

20 Claims, 6 Drawing Sheets

Related U.S. Application Data

(60) Provisional application No. 62/271,850, filed on Dec. 28, 2015.

(51) Int. Cl.
*G06F 21/31* (2013.01)
*G06Q 20/36* (2012.01)

(52) U.S. Cl.
CPC ..... *G06Q 20/3672* (2013.01); *G06Q 20/3674* (2013.01); *G06F 2212/178* (2013.01); *G06F 2221/0711* (2013.01)

(56) References Cited

U.S. PATENT DOCUMENTS

| | | | |
|---|---|---|---|
| 8,032,932 B2 * | 10/2011 | Speyer | H04L 9/3228 726/9 |
| 8,849,075 B2 | 9/2014 | Painter et al. | |
| 2003/0100320 A1 | 5/2003 | Ranjan | |
| 2004/0019571 A1 * | 1/2004 | Hurwitz | G06Q 20/387 705/65 |
| 2009/0165095 A1 | 6/2009 | Ishikawa et al. | |
| 2010/0153273 A1 | 6/2010 | Sellars et al. | |
| 2010/0174914 A1 | 7/2010 | Shafir | |
| 2012/0271770 A1 | 10/2012 | Harris et al. | |
| 2013/0036048 A1 | 2/2013 | Campos et al. | |
| 2013/0086141 A1 | 4/2013 | Saldhana | |
| 2013/0332575 A1 | 12/2013 | Song et al. | |
| 2014/0229375 A1 | 8/2014 | Zaytzsev et al. | |
| 2014/0344153 A1 | 11/2014 | Raj et al. | |
| 2014/0365363 A1 | 12/2014 | Knudsen et al. | |
| 2015/0032626 A1 | 1/2015 | Dill et al. | |
| 2015/0032627 A1 * | 1/2015 | Dill | G06Q 20/40 705/44 |
| 2015/0254646 A1 * | 9/2015 | Harkey | G06Q 20/385 705/67 |
| 2015/0312038 A1 * | 10/2015 | Palanisamy | G06F 21/44 713/155 |
| 2016/0261581 A1 | 9/2016 | Wang et al. | |
| 2016/0308851 A1 | 10/2016 | Tiwari | |
| 2017/0364880 A1 | 12/2017 | Malhotra et al. | |

\* cited by examiner

TOKEN MANAGEMENT SYSTEMS AND METHODS

CROSS-REFERENCE TO RELATED APPLICATIONS

This application is a Continuation of U.S. patent application Ser. No. 15/380,966 entitled "TOKEN MANAGEMENT SYSTEMS AND METHODS," filed Dec. 15, 2016, which claims the benefit of and priority to U.S. Provisional Patent Application No. 62/271,850 entitled "TOKEN MANAGEMENT SYSTEMS AND METHODS," filed Dec. 28, 2015, both of which are incorporated herein by reference in their entireties.

BACKGROUND

Individuals often have a plurality of tokens associated with one or more accounts with a plurality of entities. The tokens generally serve as non-sensitive proxies to actual account numbers. For example, when a user registers a credit card with a mobile wallet (e.g., Apple Pay®, Android Pay®, etc.), the user's credit card account number is tokenized such that the token is passed through the payment network instead of the user's actual credit card number. In the above-noted example, the token acts as a proxy to the actual credit card number. When the token is received by the entity that created or manages the tokens for the credit cards, the actual credit card account can be retrieved based on the token from a token vault. Tokens can take any form, including a string of digits (e.g., a credit card token), an e-mail address, a phone number, a passcode, a random number (e.g., in the form of an RSA token), or the like. Generally, each entity may create, provide, and manage tokens associated with the entity. When a user needs to make a change to his or her tokens (e.g., change a cell phone number, update a credit card token, change an e-mail address, etc.), the user must log in to each entity separately to modify the information. This process can be cumbersome. Further, the user may forget to update the information for one or more of the entities because the user may forget which information was provided to which entity. Systems and methods for providing token management and visibility are desired.

SUMMARY

One example embodiment relates to a method of managing tokens with a token management service. The method includes receiving, by a token management system associated with the token management service, a registration request from a user device associated with a user to register with the token management system. The method further includes creating, by the token management system, a user profile associated with the user. The method includes receiving, by the token management system and from the user device, a request from the user to register a token with the token management system. The token is associated with the user and is maintained by an entity. The method further includes requesting, by the token management system from an entity computing system associated with the entity, access to the token. The token is stored in a token vault maintained by the entity computing system. The method includes receiving, by the token management system and from the user device, a token command from the user. The method further includes modifying, by the token management system, the token in the token vault based on the token command.

Another example embodiment of the present disclosure relates to a method of managing tokens with a token management service. The method includes receiving, by a token management system associated with the token management service, a registration request from a user device associated with a user to register with the token management system. The method further includes creating, by the token management system, a user profile associated with the user. The method includes receiving, by the token management system and from the user device, a request from the user to register a token maintained by an entity with the token management system. The token is associated with the user and the entity. The method includes registering, by the token management system, with an entity computing system associated with the entity such that the token management system can transmit requests to modify the token. The method further includes receiving, by the token management system and from the user device, a token command from the user. The method includes transmitting, by the token management system and to the entity computing system, a request to modify the token based on the token command. The request to modify the token causes the entity computing system to modify the token.

Yet another example embodiment relates to a token management system. The system includes a network interface structured to communicate with a user device associated with a user and a plurality of entity computing systems, each of the plurality of entity computing systems associated with a different entity. The system further includes memory. The system includes a processor structured to receive, from the user device, a registration request to register with the token management system. The processor is further structured to create a user profile associated with the user. The processor is structured to receive, from the user device, a request to register a token with the token management system. The token is associated with the user and is maintained by an entity. The processor is further structured to request, from the entity computing system associated with the entity, access to the token. The token is stored in a token vault maintained by the entity computing system. The processor is further configured to receive, from the user device, a token command from the user, and to modify the token in the token vault based on the token command.

These and other features, together with the organization and manner of operation thereof, will become apparent from the following detailed description when taken in conjunction with the accompanying drawings.

DETAILED DESCRIPTION

Referring to the figures generally, token management systems and methods are described. The token management systems and methods are configured to receive a plurality of tokens from a plurality of entities (e.g., financial institutions, insurance companies, health care providers, etc.) associated with a user and to enable the user to manage the tokens in a secure, convenient, efficient, and time-saving manner. The token management system may be accessed with at least one user device (e.g., a mobile device, a smart watch, etc.). In some arrangements, the token management system is structured to receive a registration request from a user, request a plurality of tokens from different entities where the user has associated tokens, and to provide various token management functions to the user. The token management functions allow the user to change, reassociate, activate, and deactivate the tokens, as well as create new tokens. As used herein, a "token" refers to a digital or electronic proxy for another thing. For example, a token can be a proxy for an account number, a user login credential, or the like. In the example, a user can transmit a token to a receiving device (e.g., a point-of-sale device) instead of the actual account number thereby concealing the actual account number from the receiving device or fraudsters.

Figure 1:
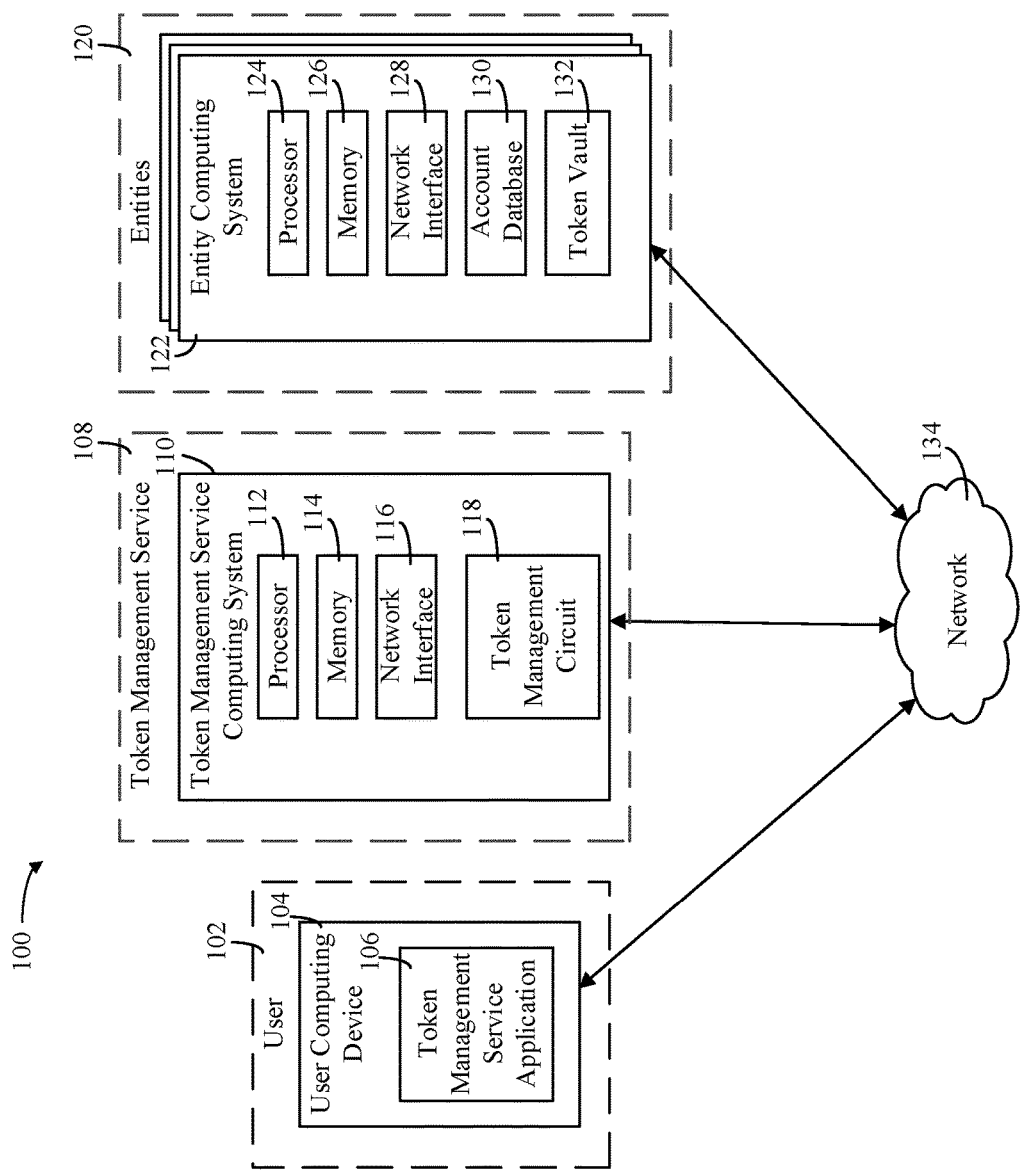
FIG. 1 is a diagram of a computing system, according to an example embodiment.

Referring now to FIG. 1, a diagram of a computing system 100 is shown according to an example embodiment. The computing system 100 includes a user computing device 104 associated with a user 102, a token management service 108, a plurality of entities 120 that generate and issue tokens, and a network 134. The user 102 may include individuals, business representatives, large and small business owners, other entities, and so on. The user 102 has an account with at least one of the plurality of entities 120. In some arrangements, the token management service 108 is a token generating and issuing entity or affiliated with a given entity 120. In other arrangements, the token management service 108 is not directly affiliated with a given entity 120.

The user 102 is associated with a user computing device 104. The user computing device 104 may be, but is not limited to, a phone (e.g., smartphone, etc.), a mobile computing device (e.g., tablet computer, laptop computer, person digital assistant, etc.), a desktop computing device, a wearable computing device, or the like. Wearable computing devices refer to any type of computing device that a user 102 wears including, but not limited to, a watch (e.g., a smart watch), glasses (e.g., eye glasses, sun glasses, smart glasses, etc.), bracelet (e.g., a smart bracelet), etc.

The user computing device 104 includes a token management service application 106. The token management service application 106 is structured to allow the user 102 to communicate with the token management service 108. For example, the token management service application 106 may be structured as a user interface that permits the user 102 to provide information that is communicated to the token management computing system 110 (e.g., a token modification request). In this regard, the token management service application 106 may be communicably coupled to a processor, memory, and network interface of the user computing device 104. In addition, the token management service application 106 communicates data to and from the token management service computing system 110 via network 134. In some arrangements, the user 102 first downloads the token management service application 106 prior to use. In another arrangement, the token management service 106 is hard coded into the memory of the user computing device 104. In further arrangements, the token management service application 106 is a web-based interface application accessed via the Internet on a web browser executed on the user computing device 104. In such arrangements, the token management service application 106 is executed and maintained remotely (e.g., on the token management service computing system 110). In this instance, the user 102 logs onto or accesses the web-based interface to access the token management service application 106. In some arrangements, the token management service application 106 is supported by a separate computing system comprising one or more servers, processors, network interface circuits, etc. that transmit the applications for use to the user computing device 104. In certain embodiments, the token management service application 106 may include an application programming interface (API) and/or a software development kit (SDK) that facilitate the integration of other applications with the token management service application 106. The structure and function of the token management service application 106 and the token management computing system 110 is explained in further detail below with respect to FIGS. 2, 3, and 4.

The token management service 108 includes a token management service computing system 110. The token management service computing system 110 includes a processor 112, memory 114, a network interface 116, and a token management circuit 118. The processor 112 may be any of a processor, an application specific integrated circuit (ASIC), a digital signal processor (DSP), a distributed processing system, or another suitable electronic processing component. The memory 114 (e.g., RAM, ROM, NVRAM, Flash Memory, hard disk storage, etc.) stores data and/or program modules for facilitating at least some of the various processes described herein. The program modules stored in the memory 114, when executed by the processor 112, control the operation of the token management service computing system 110.

The token management service computing system 110 includes a network interface 116. The network interface 116 facilitates the sending and receiving of data, commands, instructions, values, etc. over the network 134 (e.g., to and from the user computing device 104, to and from the entity computing system 122, etc.).

The token management circuit 118 of the token management service computing system 110 provides management and visibility of the tokens to the user 102 via the token management service application 106. The operation of the token management computing system 110 and the token management circuit 118 are described in further detail below with respect to FIGS. 2 through 5.

Each of the plurality of entities 120 includes an entity computing system 122. The entity computing system 122 is operated and/or associated with a respective entity 120. Each of the entities 120 provide account services to a plurality of users, including the user 102. Each entity 120 may be, for example, a financial institution, an insurance company, a utility company, a social media network, an e-mail system, a health care provider, or the like. The entity computing system 122 maintains information about the entity 120, information regarding the account(s) held by user 102 at the entity 120, token information, and the like. Each entity computing system 122 is communicably coupled to token management service computing system 110 (e.g., token management computing system 118) via the network 134. In some arrangements, a given entity 120 may be certified as trusted and/or verified by the token management service 108. In such arrangements, the token management service 108 can verify that the entity 120 meets the security standards and compatibility standards associated with the token management service 108. If an entity 120 is certified as trusted and/or verified, the entity 120 may advertise as being compatible and previously vetted with the token management service 108 to encourage its customers to use the token management service 108 (e.g., by providing a seal of approval associated with the token management service 108 on the website of the entity 120).

Each entity computing system 122 includes a processor 124, memory 126, a network interface 128, an account database 130, and a token vault 132. In some arrangements, the token vault 132 is held by a third-party, such as the token management service 108 or another third-party. The processor 124 may be any of a processor, an application specific integrated circuit (ASIC), a digital signal processor (DSP), a distributed processing system, or other suitable electronic processing components. The memory 126 (e.g., RAM, ROM, NVRAM, Flash Memory, hard disk storage, etc.) stores data and/or program modules for facilitating at least some of the various processes described herein. The program modules stored in the memory 126, when executed by the processor 124, control the operation of the entity computing system 122. The entity computing system 122 includes network interface 128. The network interface 128 facilitates the sending and receiving of data, commands, instructions, values, etc. over the network 134 (e.g., to and from the token management computing system 110, etc.).

The entity computing system 122 also includes an account database 130 that stores customer information and account information relating to accounts held by the user 102 of the respective entity 120. In this regard and as mentioned above, more than one entity 120 with an associated entity computing system 122 may be communicably coupled to the components of FIG. 1 over the network 134 to accommodate several accounts held by the user 102 by a plurality of entities 120. For example, if the entity 120 is a financial institution, the account database may store user account information including account numbers, balances, credit limits, and the like.

Still referring to FIG. 1, the entity computing system 122 may also include a token vault 132 structured to store tokens and information pertaining thereto of users. For example, the token vault 132 stores associations between issued tokens and the account numbers for which the tokens are proxies. The token vault 132 may be communicably and operatively coupled to the account database 130. Accordingly, when the entity computing system 122 receives an information request including a token from a different entity (e.g., a merchant, a point of sale system, an account login system, etc.), the entity computing system 122 cross-references the token vault 132 to identify the information that the token serves as a proxy for in order to provide the requested information to the requesting entity. The requested information may relate to an account number from the account database, user information relating to the user associated with the token, or the like. In some arrangements, the token vault 132 is maintained by a third-party. The third-party may be the token management service 108 or another organization. For example, a payment network (e.g., Visa, MasterCard, etc.) may serve as a token vault 132 for credit card issuers (e.g., financial institutions).

Figure 2:
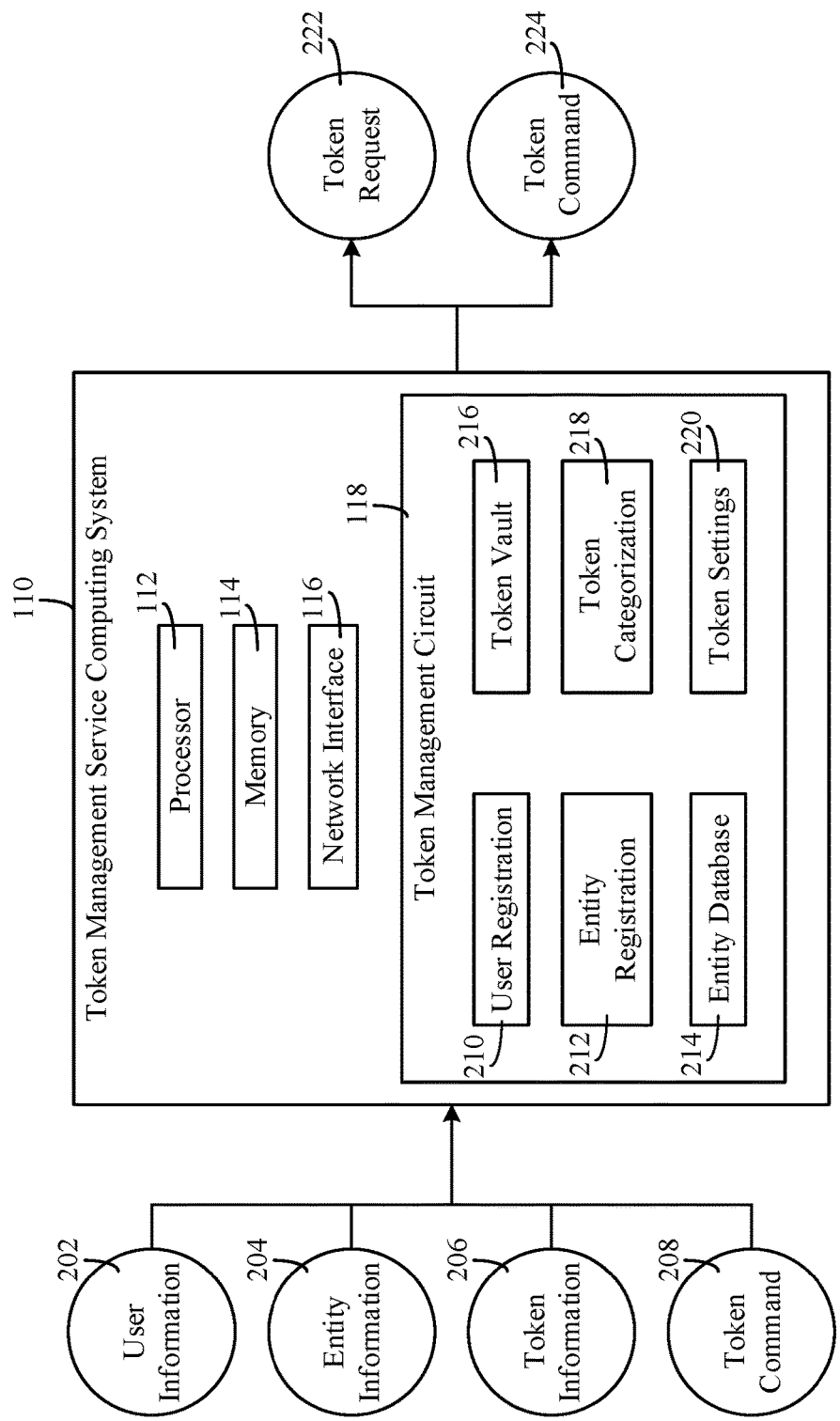
FIG. 2 is a diagram of the token management system of FIG. 1.

FIG. 2 shows the token management service computing system 110 in greater detail. The token management service computing system 110 is structured to provide management and visibility of one or more token for one or more entity 120 to the user 102. The token management service computing system 110 communicates data to and from the token management service application 106 and the entity computing system 122 via the network 134. The token management service computing system 110 receives a plurality of inputs, including, but not limited to, user information 202, entity information 204, token information 206, and token command 208 from at least the token management service application 1067 and the entity computing system 122. The token management circuit 118 is also structured to provide a token request 222 to one or more of the plurality of entities 120. The token request 222 requests a user-specified token from a given entity computing system 122. The token management circuit 118 also selectively provides token commands 224 to the entity computing systems 122. Each of the token commands 224 notifies the receiving entity computing system 122 about a token management function indicated by the user 102 with respect to a target token. The token management circuit 118 includes a user registration program 210, an entity registration program 212, an entity database 214, a token vault 216, a token categorization program 218, and a token settings program 220 to implement, store, and transmit data in association with the below-described token management methods.

The user information 202 is transmitted to the token management service computing system 110 via the token management service application 106 of the user computing device 104. The first time the user 102 sends user information to the token management service computing system 110, the user registration program 210 treats the information as a request to create a profile with the token management service 108. Accordingly, in such situations, the token management circuit 118 creates a user profile. The user profile contains user information received from the user 102. The user profile may also include system preferences the user 102 defines. The system preferences may include a security preference, a usage preference, and so on. The security preference may define the requirements needed before accessing the token management service computing system 110 via the token management application 106. For example, a user 102 may have to provide a password (e.g., word, phrase, alphanumeric value, biometric scan, etc.) before the token management service computing system 110 is accessible. The user profile may also allow a user to define commands (e.g., activate a token, deactivate a token, etc.) that require a second passcode to authorize.

The entity information 204 is transmitted to the token management service computing system 110 by the user 102 via the token management service application 106. The entity information 204 allows the token management system 100 to register at least one of the plurality of entities 120 with the token management service computing system 110 and associate the registered entity 120 with the user profile. In some arrangements, the user 102 provides entity information 204 by selecting an entity 120 to register with the token management service 108 from a drop down menu of approved entities 120 provided by the token management service 108 (e.g., via a user interface of the token management service application 106). The token management service computing system 110 creates an entity profile for each entity 120 registered, or associates an entity selected from the drop down menu with the user profile. In order to register an entity with the token management service computing system 110, the user 102 may have to provide credentials (e.g., username, password, word, phrase, alphanumeric value, etc.), a biometric scan (e.g., a fingerprint scan, a retina scan, a voice sample, etc.), a semi-random number (e.g., as generated by a changing security token device), or a combination thereof before the token management service computing system 110 is accessible for a given entity. By providing the credentials, the user 102 is authorizing the token management service 108 to access the user's account with the entity 120 such that the token management service 108 can modify and manage any token(s) associated with the entity 120 and the user 102 via the token management service computing system 110. The token management service computing system 110 requests token information (token request 222) from the entity 120. The token management service computing system 110 may also request additional information from the entity 120 to create a more accurate and robust entity profile to be stored in the entity database 214.

The token management service computing system 110 receives token information 206 from the plurality of entities 120. The token information 206 includes one or more tokens used by a given entity 120 to identify the user 102 with an account held at the entity 120. Each token serves as a digital proxy for another piece of information relating to the user 102 and/or the entity 120. For example, the token may be an identity token (e.g., a token that is representative an identity of the user 102, such as a phone number, email, etc.), an account token (e.g., a token that is representative of an account number of the user 102, such as a credit card token), a data token (e.g., a token that is representative of data or information, such as healthcare information, insurance information, etc.), a biometric token (e.g., a token that is representative of a biometric of the user 102, such as a finger print, a retina scan, a voice print, etc.), a token that is representative of any other piece of information the user 102 has tokenized with the entity 120. The token management service computing system 110 may receive access to the token. In this regard, the token management service computing system 110 has management capabilities associated with the token. Alternatively, the token management service computing system 110 may receive a copy of the token. In this regard, the token is still managed by the entity 120, but the token management service computing system 110 can provide management requests to the entity computing system 122. The token information 206 may also include token preferences that were set by the entity 120 or the user 102 prior to the token management service computing system 110 receiving the token. The token information 206 is stored in token vault 216. Alternately, the entity 120 may transmit token vault 132 for management of the tokens by the token management service computing system 110. The token management service computing system 110 may provide the actual token (e.g., phone number, email, etc.) to the user 102. Alternatively, the token management service provider 110 may provide a representation of the token (e.g., "Wells Fargo Credit Card—Mobile Wallet token", etc.) to the user 102 to maintain privacy of the actual token.

The token management service computing system 110 also receives token command 208. The token command 208 may be any of a plurality of commands to manage the tokens of token database 216. For example, the token command 208 can command a given entity computing system 122 to disable a token, to delete a token, to activate a token, to create a new token, to modify the settings of a token, to apply a token use rule to a token (e.g., limit token use to a geographic area, limit token use to certain times of the day, limit token use to certain days of the week, limit token use to a transaction limit for tokens associated with a financial account, etc.), or to change a token (e.g., the token is a phone number of the user and the user gets a new phone number). In some arrangements, the token command 208 can command a given entity computing system to change one or more entities 120 associated with a token or to limit the use of a token to one or more entity 120. In further arrangements, the token command 208 can categorize the token, which is described in further detail below with respect to FIG. 4. The token vault 216 maintains the tokens and all settings associated with the tokens.

The token management service computing system 110 selectively provides a token command 224 to one or more entity computing systems 122 based on the token command 208 received from the user 102. For example, if the token command 208 affects the use of the token with respect to one or more of the plurality of entities 120 (e.g., activation/deactivation settings, token creation, etc.), the token management system 100 will provide the appropriate entity computing system 122 with the token command 224. If the token command 208 is categorizing the token, the token management service computing system 110 will not provide any of the entities 120 with token command 224. The entity computing system 218 updates the token vault 132 based on the token command 224 provided by the token management service computing system 110. Alternatively, if entity 120 transmitted token vault 132 to the token management service computing system 110 or provided access to token (e.g., management capabilities, etc.) the token management service computing system 100 will update the token in the token vault 132 based on the token command 208 from the user 102. In this case, no token command 224 needs to be transmitted to the specified entity 120.

Figure 3:
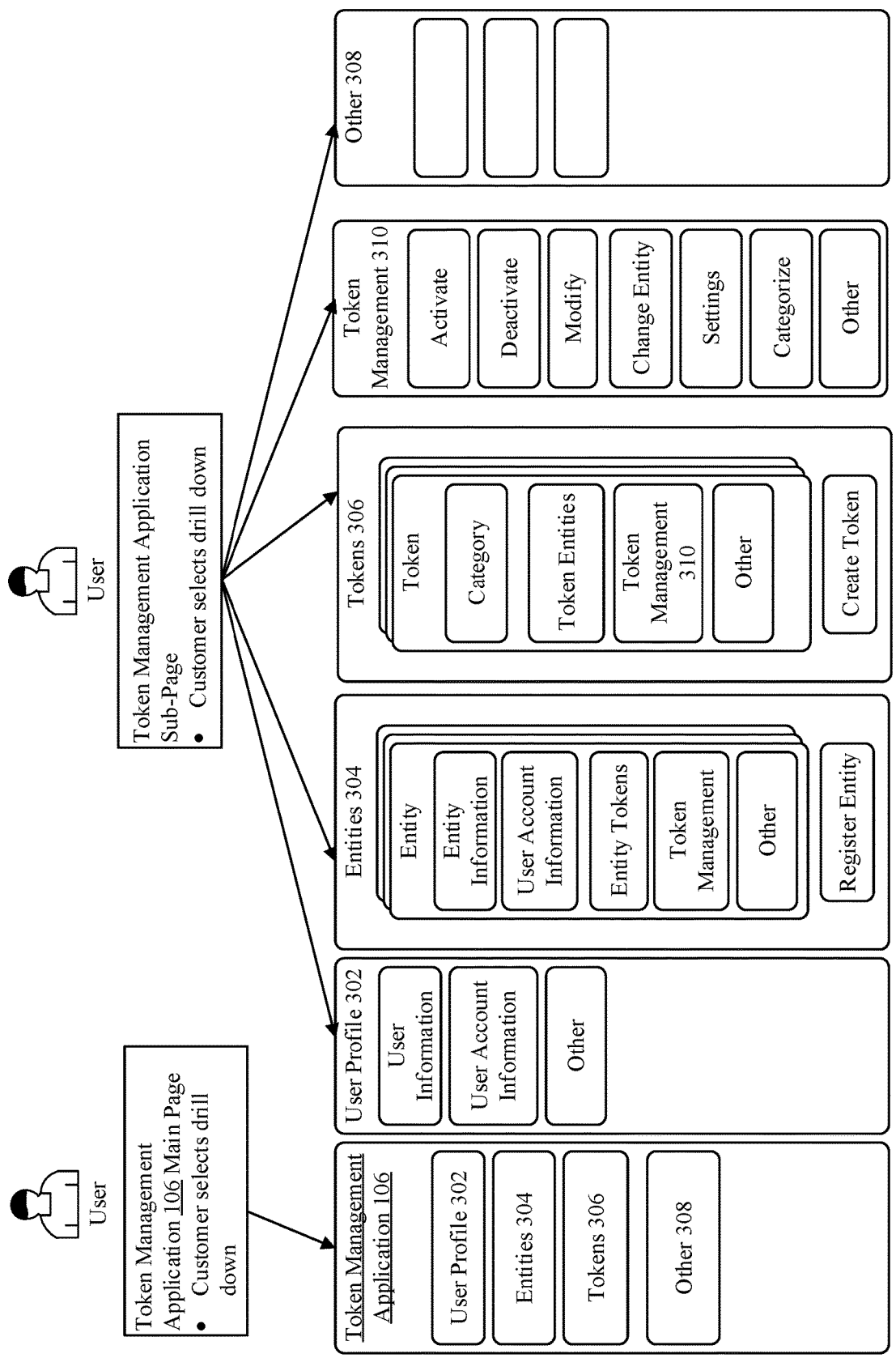
FIG. 3 is a diagram of the token management service application of FIG. 1.

Referring now to FIG. 3, a diagram of tools provided to the user 102 via the token management service application 106 operating on the user computing device 104 of FIG. 1 is shown according to an example embodiment. The tools provide the user 102 with different ways of entering, updating, accessing, viewing, managing, and analyzing tokens associated with user 102. By way of a top-level menu level of the token management service application 106, the user 102 is provided with user profile tools 302, entities tools 304, tokens tools 306, and other tools 308. The user 102 is taken to a drill down menu that provides further options and tools by selecting one of the top-level menu items. The user profile tools 302 allow a user to enter personal information and account information into the token management service 108 through the user computing device 104. The data may be gathered by the user 102 typing information into a user interface or by capturing the information via other methods, including but not limited to capturing images, a vocal recording, a video recording, etc. The user profile tools 302 have a drill down menu that provides more functions for the application. The user profile tools 302 include tools such as user information, user account information, or the like. The user information tool provides the user 102 access to the personal information previously entered, and allows the user 102 to modify personal information associated with user 102. The user account information provides the user 102 access to the account information associated with the user profile created by the token management service computing system 110. Any of the tools and functional units discussed above and below may contain logic executable by a processor to achieve the described functions.

The entities tools 304 allow the user 102 to view, access, enter and modify information relating to the entities associated with the user 102. The entities tools 304 have a drill down menu that provides more functions for the application.

The entities tools 304 include tools such as entity information, user account information, entity tokens, token management 310, or the like. These tools are provided for every entity registered with the token management service computing system 110. The entity tools 304 also include a register entity tool to allow the user 102 to add additional entities 120 to the user account for user 102 with the token management service computing system 110. The entity information includes information relating to the entity 120 (e.g., entity name, phone number, address, etc.). The user account information includes information relating to the user account associated with entity 120 (e.g., checking account for a financial institution, etc.). The entity tokens include information relating to the token or tokens associated with the entity 120. Token management 310 allows the user 102 to modify the tokens associated with the entity 120 (e.g., activate, deactivate, change, etc.).

The tokens tools 306 allow the user 102 to view, access, enter and modify tokens relating to the entities associated with the user 102. The tokens tools 306 have a drill down menu that provides more function for the application. The tokens tools 306 include tools such as category, token entities, token management 310 and the like. These tools are provided for every token associated with the user 102 with the token management service computing system 110. The token tools 306 also include a create token tool allowing the user 102 to add additional tokens to associate with user 102 with the token management service computing system 110. The create token tool may allow the user 102 to create a biometric token, a data token, an identity token, or another type of token. The category tool allows the user 102 to categorize the token (e.g., checking account token, medical information token, etc.). The token entities allow the user 102 to view and modify which entities 120 are associated with the token. The token management 310 allows the user 120 to modify the content of the token.

The token management tools 310 allows the user 102 to manage settings of the tokens associated with the token management service computing system 110. Token management tools 310 include activate, deactivate, modify, change entity, settings, categorize, and the like. The activate tool allows the user 102 to activate a token. The deactivate tool allows the user 102 to deactivate a token. The modify tool allows the user 102 to modify the token itself (e.g. the token is a phone number and the user gets a new phone number). The change entity tool allow the user 102 to change the entity or entities a token is associated with. The settings tool allows the user 102 to create specific settings for the token (e.g., location settings, time of day settings, seasonal settings, etc.). The categorize tool allows the user 102 to manage the categorization of the token. The token management tool 310 may include additional methods of managing and modifying the tokens associated with the token management service computing system 110 and user 102

Figure 4:
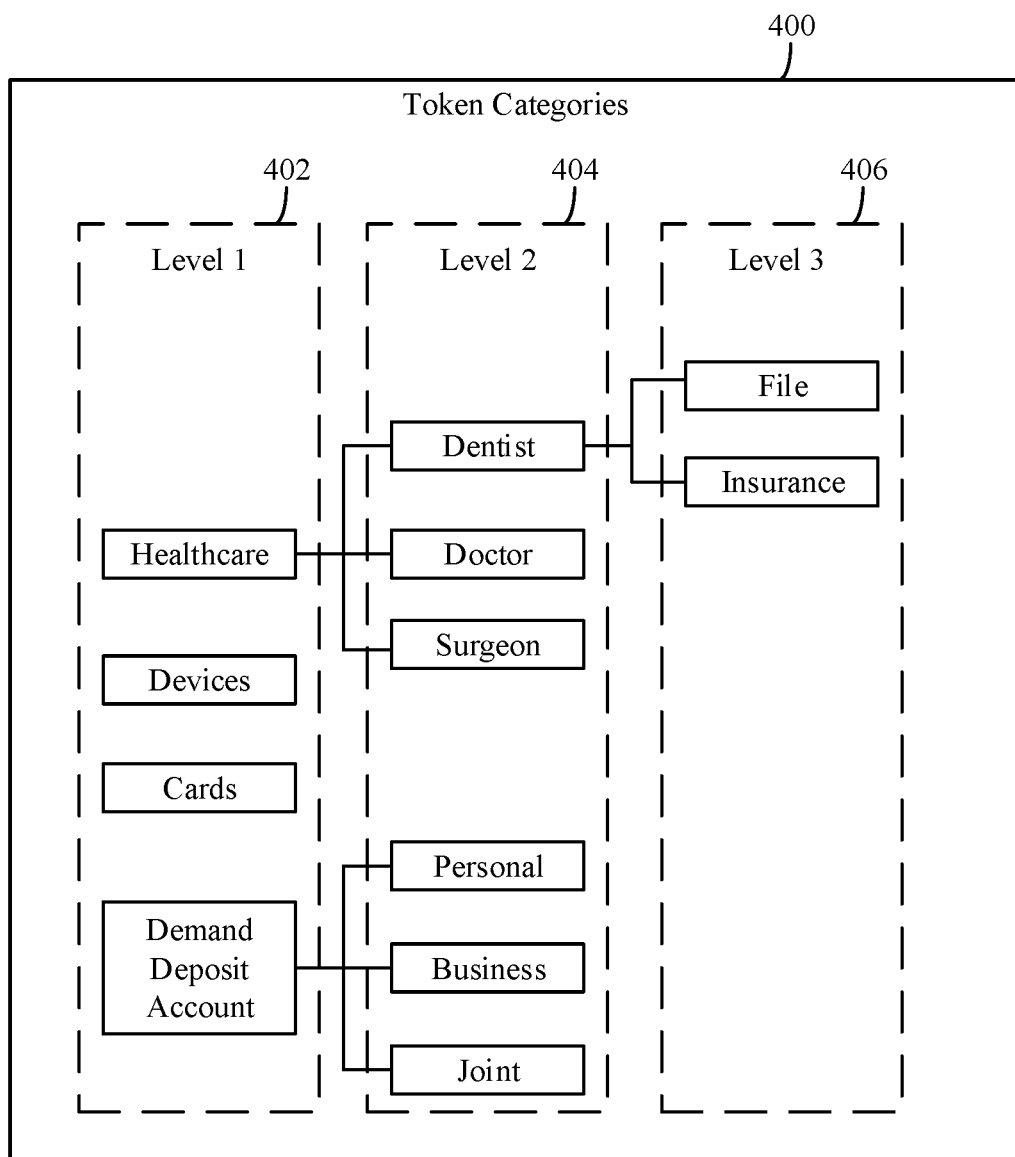
FIG. 4 is a diagram of token categorization of the token management system of FIG. 2.

Now referring to FIG. 4, a diagram of token categories 400 of the token management service computing system 110 of FIG. 2 is shown according to an example embodiment. The user 102 has the ability to categorize the tokens associated with the token management service computing system 110. The categorization of the tokens includes multiple categories, shown as healthcare, devices, cards, and demand deposit account. The categorization of the token also includes multiple levels, or subcategories, of categorization within the category (level 1 (402), level 2 (404), and level 3 (406)) to allow the user 102 to categories tokens more specifically. The multiple levels of categorization are shown as an example with healthcare and demand deposit accounts in the highest level of categorization (402). In a secondary level (404), dentist, doctor, and surgeon tokens could be placed underneath the level of healthcare. In a tertiary level (406), file and insurance tokens could be placed underneath the level of the dentist. The user 102 may create any number of categories with any number of levels (e.g., two, three, four, etc.). In some embodiments, the entity may provide information that allows the token management service computing system 110 to categorize the tokens without user input.

Figure 5:
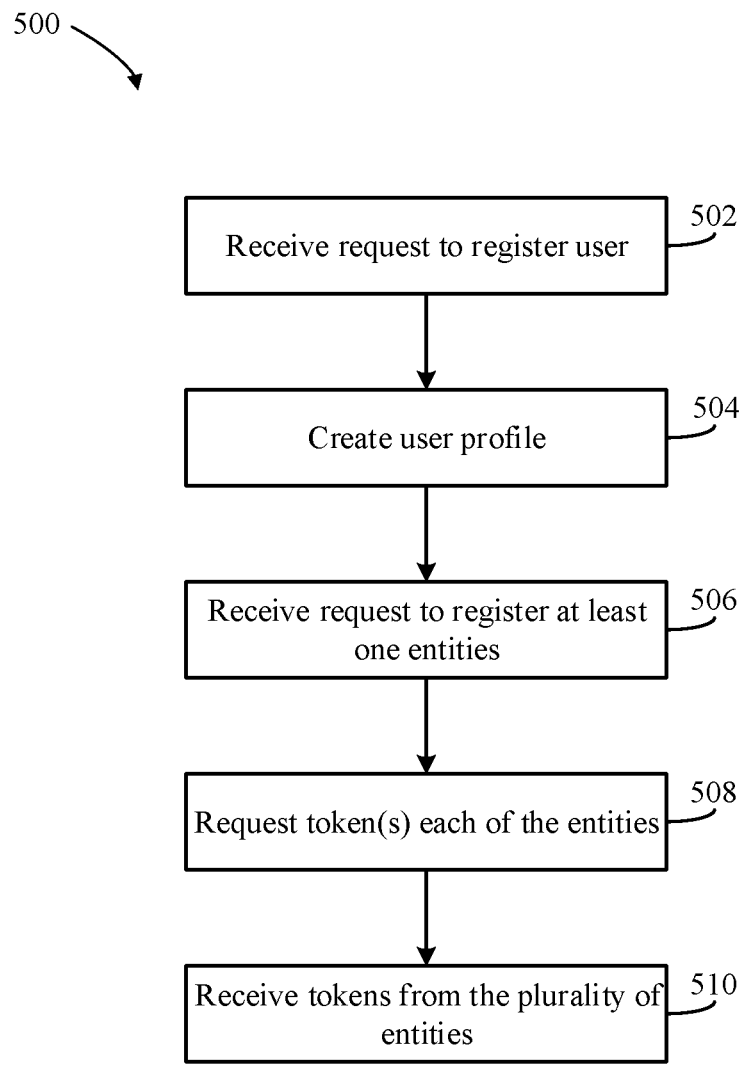
FIG. 5 is a flow diagram of a method of establishing an account with a token management system according to an example embodiment.

Referring now to FIG. 5, a flow diagram of a method 500 of establishing an account with the token management service 108 is shown according to an example embodiment. Method 500 is performed by the token management service computing system 110. Method 500 registers the user 102 and entities 120 associated with the user with the token management service computing system 110 and obtains tokens (e.g., copies of tokens, access to tokens, etc.) for user 102 associated with entities 120.

Method 500 begins when a request to register a user is received at 502. The request to register the user is received by the token management service computing system 110 from the user computing device 104 associated with the user 102. In some embodiments, the user 102 initiates the request to register via the token management service application 106. The user 102 may initiate a request to register by providing user information to the token management service computing system 110, as described above with respect to FIG. 2. In some arrangements, the information provided by the user 102 with the request includes a first name, a last name, a user name, and an email.

The token management service creates a user profile at 504. The user profile is created by the token management service computing system 110. The user profile is created based on the information received from the user 102 when they requested to register with the token management service computing system 110. The user profile contains the user information received at 502. In some arrangements, the token management service computing system 110 associates a password with the user profile. The password may be automatically generated by the token management service computing system 110 or created by the user 102. The user 102 may provide additional personal information. For example, the user may have the option to add a phone number, set preferences for the user profile, and change the password associated with the user profile. The user profile may also include system preferences the user 102 defines. The system preferences may include a security preference, a usage preference, and so on. The security preference may define the requirements needed before accessing the token management service computing system 110 via the token management application 106. For example, a user 102 may have to provide a password (e.g., word, phrase, alphanumeric value, etc.), a biometric scan (e.g., a fingerprint scan, a retina scan, a voice sample, etc.), a semi-random number (e.g., as generated by a changing security token device), or a combination thereof before the token management service computing system 110 is accessible. The user profile may also allow a user to define commands (e.g., activate a token, deactivate a token, etc.) that require a second passcode to authorize (e.g., a higher level of authentication) before activating the command.

The token management service computing system 110 receives a request to register at least one entity 120 at 506. The token management service computing system 110 receives the request from the user device 104. In some arrangements, the request identifies a single entity 120 to be registered with the token management service 108. In other arrangements, the request identifies a plurality of entities 120 to be registered with the token management service 108. For each of the entity 120, the user 102 enters information about an entity (e.g., name, location, etc.) to generate an entity registration request. In some embodiments, the user 102 selects an entity to register from a list of entities provided by the token management service computing system 110. The list of entities may be pre-approved entities that have been certified by the token management service as trusted and/or verified entities that are known to be secure and compatible with the token management service 108. In some embodiments, the user 102 may register an entity using a combination of entering entity information and selecting an entity from a list. In further arrangements, the user 102 may click on a link on a website associated with the entity 120 that indicates that the entity 120 is previously vetted as verified and/or trusted with the token management service 108. In such arrangements, the link may be a seal of approval or an advertisement encouraging the user 102 to register the entity 120 with the user's account with the token management service 108. The token management service computing system 110 creates an entity profile associated with the user profile including information about the entity. Each of the identified entities 120 are registered with the token management service computing system 110. To register an entity 120, the token management service computing system 110 and the entity 120 must authenticate one another. Authentication may include verifying that user 102 has an account with the entity 120. Authentication may also include the token management service computing system 110 and the entity 120 providing identifying information to one another to ensure each is a trusted source. Registering an entity also includes ensuring a secure communication path is established between the entity computing system 122 and the token management service computing system 110. For example, the token management service computing system 110 and the entity 120 may use standard SSL, set up a secure session or the like. Data transmitted between the token management service computing system 110 and the entity computing system 122 may be encrypted (e.g., via a standard public key infrastructure encryption scheme).

At 508, the token management service computing system 110 requests at least one token from each of the entities 120 registered at 506. The token management service computing system 110 provides user information received at 502 to the entity computing system 122 to identify the user 102 associated with the token being requested. In some arrangements, the token management service requests all of the tokens associated with the user 102 at the entity 120. In other arrangements, the token management service requests a specific token (or specific tokens) from a plurality of available tokens associated with the user 102 at the given entity 120. The token management service computing system 100 may request a copy of a token where the token will be managed by the entity 120. In this regard, token management requests provided to the token management service computing system 110 by the user 102 will be provided to the entity computing system 122 for implementation. In other arrangements, the token management service computing system 110 requests access to the actual token stored in the token vault 132 of the entity computing system 122 such that the token can be managed (e.g., modified, deleted, replaced, etc.) directly by the token management service computing system 110. In some embodiments, the token request also includes a request for tokenized information about the entity 120 to create an entity profile. The token may be an identity token (e.g., phone number, email, etc.), a data token (e.g., healthcare information, etc.), a token for a financial account, or any piece of information the entity 120 tokenized. In some arrangements, an entity 120 may use a third-party token service provider and have to request the token from the third-party token service provider before providing the token management service computing system 110 with the tokens. The token management service computing system 110 requests the tokens using the secure communication established at process 506.

The token management service computing system 110 receives one or more tokens from the plurality of entities 120 at 510. The entity 120 may choose to transmit a token vault (e.g., token vault 132) to the token management service computing system 110 and have the management of the token occur through the token management computing system 110. In this case, the token management service computing system 110 receives token vault 132 from the entity 120. Alternatively, the entity 120 may choose to manage the token itself. In this case, the token management service computing system 110 receives one or more tokens from the entity 120. The token management computing system 110 stores the token in the token vault 212. The token management computing system 110 also stores information relating to the preferences and entities associated with the tokens in token vault 212. Once the user's tokens are associated with the token management computing system 110, the tokens can be managed by the user 102 using the token management service application 106 (e.g., as described below with respect to the method 600).

Figure 6:
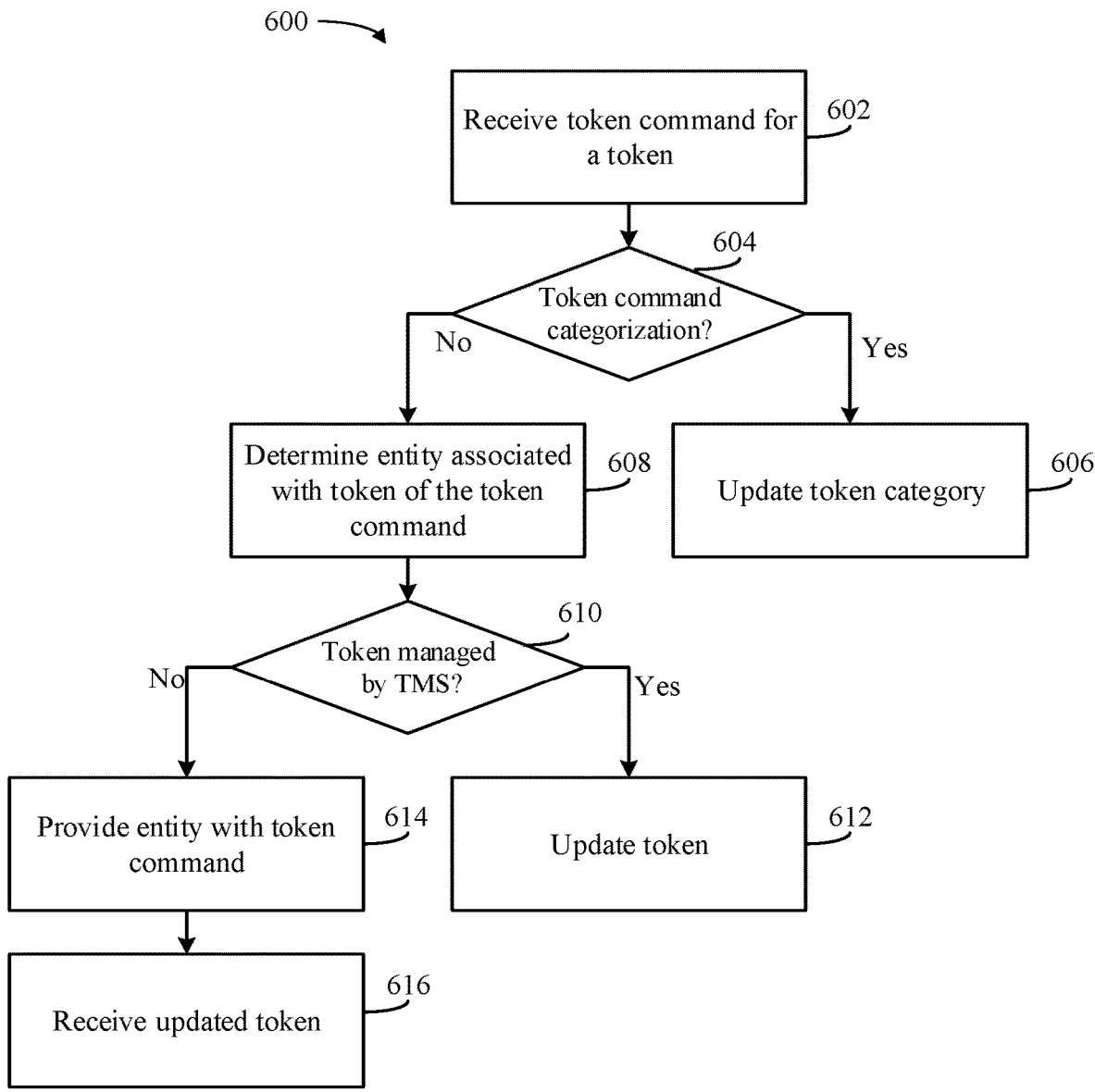
FIG. 6 is a flow diagram of a method of managing a token with a token management system according to an example embodiment.

With respect to FIG. 6, a flow diagram of a method 600 of managing a token with the token management service computing system 110 is shown according to an example embodiment. Method 600 is performed by the token management service computing system 110. Method 600 occurs after method 500 of FIG. 5. Through the method 600, the user 102 manages and modifies the tokens and preferences of the tokens registered with method 500, based on a token command received by user 102.

A token command is received from the user 102 at 602. The token management service computing system 110 receives the token command from the user computing device 106. The token command may be any of a plurality of commands to manage the tokens of token database 216. For example, the token command can command a given entity computing system 122 to disable a token, to delete a token, to activate a token, to create a new token, to modify the settings of a token, to apply a token use rule to a token (e.g., limit token use to a geographic area, limit token use to certain times of the day, limit token use to certain days of the week, limit token use to a transaction limit for tokens associated with a financial account, etc.), or to change a token (e.g., the token is a phone number of the user and the user gets a new phone number). In some arrangements, the token command can command a given entity computing system 122 to change one or more entities associated with a token or to limit the use of a token to a specific entity or entities 120. In further arrangements, the token command can categorize the token. As described in further detail below, once the command is received at 602, the token management service computing system 110 determines the type of command and a corresponding action to perform based on the command.

The token management service computing system 110 determines if the token command is a categorization command at 604. If the token command is a categorization command, the token management computing system 110 updates a token category associated with a target token at 606. All token categorization is managed by the token management service computing system 110. While entity information may be used to initially create a category for a token (e.g., if the token comes from a known healthcare company, the token may be automatically classified as a healthcare token), all tokens can be categorized or recategorized by the user 102 through the token command. The user 102 may create a plurality of categories (e.g., healthcare, devices, cards, etc.). The user 102 may also create a plurality of levels, or subcategories, of each category (e.g., dentist, surgeon and doctor under the healthcare category) through the token command. If the token command is a categorization command, the token management service computing system 110 updates the category for the token in the token vault 212. After the token category is updated, the method 600 ends.

If the token command is not a categorization command, the method 600 proceeds to 608. The token management service computing system 110 determines an entity associated with the target token of the token command at 608. In some arrangements, the single token is associated with a single entity 120. In other arrangements, the token is associated with a plurality of entities 120. For example, a token representing a credit card may be associated only with the credit card issuer or only with a credit card network, while a user's phone number phone number may serve as a token for an identity of the user 102 at a financial institution (e.g., for a peer-to-peer payment system), at a healthcare provider (e.g., as a login credential to gain account access), and/or the like. Accordingly, processes 610-616 of the method 600 are repeated for each entity 120 that is associated with the token in arrangements where a token is associated with a plurality of entities 120.

The token management service computing system 110 determines if the token is managed by the token management service computing system 110 or the entity 120 at 610. As discussed above with respect to process 510 of method 500, some tokens are directly managed and manipulated by the token management service computing system 110 while other tokens are managed and manipulated by the associated entity 120. In arrangements where the token is managed by the token management service computing system 110, the token is updated based on the token command received at process 602 at 612. In such arrangements, the entity 120 does not need to be contacted because the token management service computing system 110 is responsible for managing the tokens through token vault 132 of the entity 120. Depending on the action that the token command corresponds to, the token management service computing system can disable the token, delete the token, activate the token, create a new token to replace the token, modify the settings of the token, apply a token use rule to the token (e.g., limit token use to a geographic area, limit token use to certain times of the day, limit token use to certain days of the week, limit token use to a transaction limit for tokens associated with a financial account, etc.), or change the token (e.g., the token is a phone number of the user and the user gets a new phone number, the token can be changed to the new phone number). The changes caused by the token command are saved in the token vault 216 of the token management service computing system 110.

In arrangements where the token is not managed by the token management service computing system 110, processes 614-616 occur. The token management service computing system 110 provides the entity 120 with the token management command received at process 602 at 614. The token management service computing system 110 communicates with the entity computing system 122 through the secure method of communication established at process 506. In some arrangements, the token management command provided to the entity 120 is the same command received at 602. In other arrangements, the original token command is modified by the token management service computing system 110 to include user and/or entity preferences thereby creating a modified token command. In such arrangements, the modified token command is transmitted from the token management service computing system 110 to the entity computing system 122. For example, the original token command may be modified to include a request for the new token after the original token has been modified.

In response to the command transmitted to the entity computing system 122 at 614, the token management service computing system 110 receives an updated token from the entity computing system 122 at 616. The updated token is the token that has been updated by the entity 120 based on the token command provided at process 614. The token management service computing system 110 receives the updated token from the entity computing system 122 through the secure method of communication established at process 506. In some arrangements, the updated token is the original token that has been updated based on the token command (e.g., to include a time restriction, a geographic restriction, etc.). In other arrangements, the updated token is a confirmation that the token and preferences have been updated based on the request received at 614. In further arrangements, a net new token is received from the entity computing system 122 in response to the token command. In each of the arrangements, the token management computing system 110 stores the updated tokens and/or preferences in the token vault 216.

The above-described systems and methods provide for a centralized token management system where token information for one or more entities can be accessed and managed. The systems and methods create a more convenient and accurate method of managing tokens as users only need to access a single system when token information changes. A single system reduces the likelihood of a user forgetting to change token information for a given entity, or entering the information incorrectly because of multiple repetitions of entering the same information. The speed of managing tokens is also reduced for computing as only a single system needs to be accessed, as opposed to several systems that each contain the same token information.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of managing tokens, the method comprising:
receiving, by a token management system from a user device, a request from a user to register a token with the token management system, wherein the token is associated with the user and is stored by an entity computing system associated with a first entity of a plurality of entities, wherein each of the plurality of entities is associated with a separate entity computing system that stores at least one token of a plurality of tokens that are each registered with the token management system and each of the plurality of tokens is associated with the user; and modifying, by the token management system, the token stored by the entity computing system associated with the first entity based on a token command from the user, wherein the token command includes associating the token with a different entity of the plurality of entities relative to the first entity.

2. The method of claim 1, wherein the token is a token for at least one of an identity of the user, a login credential of the user, an account of the user, or a biometric of the user.

3. The method of claim 1, further comprising presenting, by the token management system, a user interface to the user via the user device such that user can view the token and an identity of an associated entity.

4. The method of claim 1, wherein the token command includes changing the token for the first entity.

5. The method of claim 1, wherein the token command includes activating the token for the first entity.

6. The method of claim 1, wherein the token command includes deactivating the token for the first entity.

7. A method of managing tokens, the method comprising:

receiving, by a token management system from a user device, a request from a user to register a token with the token management system, wherein the token is associated with the user and is stored by an entity computing system associated with a first entity of a plurality of entities, wherein each of the plurality of entities is associated with a separate entity computing system that stores at least one token of a plurality of tokens that are each registered with the token management system and each of the plurality of tokens is associated with the user;

registering, by the token management system, the entity computing system associated with the first entity with the token management system; and transmitting, by the token management system to the entity computing system associated with the first entity, a request to modify the token, wherein the request to modify the token causes the entity computing system associated with the first entity to modify the token, the modification comprising associating the token with a different entity of the plurality of entities relative to the first entity.

8. The method of claim 7, wherein the token is a token for at least one of an identity of the user, a login credential of the user, an account of the user, or a biometric of the user.

9. The method of claim 7, further comprising presenting, by the token management system, a user interface where the user can view a copy of the token and an identity of an associated entity.

10. The method of claim 7, further comprising receiving, by the token management system from the user device, a category associated with the token.

11. The method of claim 7, wherein the modification further comprises changing the token for the first entity.

12. The method of claim 7, wherein the modification further comprises activating the token for the first entity.

13. The method of claim 7, wherein the modification further comprises deactivating the token for the first entity.

14. A token management computing system comprising:

a network interface structured to communicate with a user device associated with a user and a plurality of entity computing systems, each of the plurality of entity computing systems associated with a separate entity of a plurality of entities, wherein each of the plurality of entity computing systems stores at least one token of a plurality of tokens that are each associated with the user;

a processing circuit structured to:

receive a request to register a token with the token management computing system, wherein the token is associated with the user and is stored by an entity computing system associated with an entity of the plurality of entities; and modify the token stored by the entity computing system based on a token command, wherein the token command includes associating the token with a different entity of the plurality of entities relative to the entity.

15. The system of claim 14, wherein the token is a token for at least one of an identity of the user, a login credential of the user, an account of the user, or a biometric of the user.

16. The system of claim 14, wherein the processor is further structured to present, via the user device, a user interface where the user can view the token and an identity of an associated entity.

17. The system of claim 14, wherein the processor is further structured to receive, from the user device, a category associated with the token.

18. The system of claim 14, wherein the token command includes changing the token for the entity.

19. The system of claim 14, wherein the token command includes activating the token for the entity.

20. The system of claim 14, wherein the token command includes deactivating the token for the entity.

* * * * *